(12) United States Patent
Chou et al.

(10) Patent No.: US 11,256,359 B2
(45) Date of Patent: Feb. 22, 2022

(54) TOUCH SCREEN, TOUCH DISPLAY SCREEN AND DISPLAY DEVICE

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventors: Shihpo Chou, Beijing (CN); Jing Zhang, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 29 days.

(21) Appl. No.: 16/650,530

(22) PCT Filed: Mar. 29, 2019

(86) PCT No.: PCT/CN2019/080518
§ 371 (c)(1),
(2) Date: Mar. 25, 2020

(87) PCT Pub. No.: WO2020/198974
PCT Pub. Date: Oct. 8, 2020

(65) Prior Publication Data
US 2021/0240326 A1    Aug. 5, 2021

(51) Int. Cl.
*G06F 3/041* (2006.01)
*G06F 3/044* (2006.01)
(Continued)

(52) U.S. Cl.
CPC ........ *G06F 3/04164* (2019.05); *G06F 1/1652* (2013.01); *G06F 3/047* (2013.01);
(Continued)

(58) Field of Classification Search
CPC .. G06F 3/04164; G06F 3/0446; G06F 3/0412; G06F 1/1652; G06F 3/047;
(Continued)

(56) References Cited

U.S. PATENT DOCUMENTS 8,654,095 B1 * 2/2014 Cho ...................... G06F 1/1641
                                                    345/173
9,372,509 B2 * 6/2016 Chang .................. G06F 3/0448
(Continued)

FOREIGN PATENT DOCUMENTS

CN         204143398 U      2/2015
CN         106547407 A      3/2017
(Continued)

*Primary Examiner* — Amy Onyekaba

(57) ABSTRACT

A touch screen, a touch display screen and a display device are provided. The touch screen includes a first region and a second region. The first region can be bent, and the first region is in a flat state when the touch screen is in a flat state and is in a curved state when the touch screen is in a folded state. The first region includes a plurality of first touch patterns arranged in an array in a first direction and a second direction when the touch screen is in the flat state. The plurality of first touch patterns are in the same layer and adjacent first touch patterns are insulated from each other, the first direction is intersected with the second direction, and the second region is connected with the first region.

19 Claims, 8 Drawing Sheets

(51) Int. Cl.
*G06F 1/16* (2006.01)
*G06F 3/047* (2006.01)

(52) U.S. Cl.
CPC .......... *G06F 3/0412* (2013.01); *G06F 3/0443* (2019.05); *G06F 3/0446* (2019.05); *G06F 2203/04102* (2013.01); *G06F 2203/04111* (2013.01); *G06F 2203/04112* (2013.01)

(58) Field of Classification Search
CPC ......... G06F 3/0443; G06F 2203/04111; G06F 2203/04112; G06F 2203/04102
See application file for complete search history.

(56) References Cited

U.S. PATENT DOCUMENTS

| | | | | |
|---|---|---|---|---|
| 10,474,295 | B2* | 11/2019 | Kim | H01L 27/323 |
| 11,005,057 | B2* | 5/2021 | Zhu | H01L 51/5281 |
| 2010/0321308 | A1* | 12/2010 | Lin | G06F 3/0446 |
| | | | | 345/173 |
| 2012/0162099 | A1* | 6/2012 | Yoo | G06F 3/0443 |
| | | | | 345/173 |
| 2013/0234973 | A1* | 9/2013 | Kim | G06F 3/041 |
| | | | | 345/173 |
| 2013/0321004 | A1* | 12/2013 | Chen | G01R 1/06 |
| | | | | 324/663 |
| 2014/0043252 | A1* | 2/2014 | Kim | G06F 3/0448 |
| | | | | 345/173 |
| 2014/0320769 | A1* | 10/2014 | Masuda | G06F 3/0446 |
| | | | | 349/12 |
| 2015/0022734 | A1* | 1/2015 | Yang | G06F 3/0443 |
| | | | | 349/12 |
| 2015/0241924 | A1* | 8/2015 | Chang | G06F 3/0446 |
| | | | | 349/12 |
| 2016/0011689 | A1* | 1/2016 | Kim | G06F 3/0443 |
| | | | | 345/173 |
| 2016/0178949 | A1* | 6/2016 | Wang | G06F 3/04164 |
| | | | | 349/12 |
| 2016/0239133 | A1* | 8/2016 | Ko | G06F 1/1643 |
| 2016/0246393 | A1* | 8/2016 | Lee | G06F 3/041 |
| 2016/0282992 | A1* | 9/2016 | Song | G06F 3/0448 |
| 2016/0282993 | A1* | 9/2016 | Song | G06F 3/0446 |
| 2016/0306476 | A1* | 10/2016 | Ko | G06F 3/0445 |
| 2017/0102342 | A1* | 4/2017 | Iwami | G06F 3/0412 |
| 2017/0147130 | A1* | 5/2017 | Kwon | G06F 3/0412 |
| 2017/0315645 | A1* | 11/2017 | Park | G06F 3/04146 |
| 2017/0336907 | A1* | 11/2017 | Jeong | G06F 3/0412 |
| 2017/0344162 | A1* | 11/2017 | Lee | G06F 3/0443 |
| 2018/0039352 | A1* | 2/2018 | Wu | G06F 3/044 |
| 2018/0284918 | A1* | 10/2018 | Cai | G02F 1/13338 |
| 2018/0284934 | A1* | 10/2018 | Wu | G06F 3/0412 |
| 2018/0321708 | A1* | 11/2018 | Wu | G06F 3/0443 |
| 2018/0329530 | A1* | 11/2018 | Yu | G06F 3/0446 |
| 2018/0329555 | A1* | 11/2018 | Kim | G06F 3/0443 |
| 2018/0350885 | A1* | 12/2018 | Choi | G06F 3/0412 |
| 2019/0018519 | A1* | 1/2019 | Kim | G06F 3/0448 |
| 2019/0064958 | A1* | 2/2019 | Liu | G06F 3/0446 |
| 2019/0179445 | A1* | 6/2019 | Moon | G06F 3/0445 |
| 2019/0179461 | A1* | 6/2019 | Baek | G06F 3/0412 |
| 2019/0204964 | A1* | 7/2019 | Wang | G06F 3/0443 |
| 2020/0081562 | A1 | 3/2020 | Shi | |
| 2020/0192509 | A1* | 6/2020 | Zhao | G06F 3/0412 |

FOREIGN PATENT DOCUMENTS

| | | |
|---|---|---|
| CN | 108255331 A | 7/2018 |
| CN | 109508118 A | 3/2019 |

* cited by examiner

TOUCH SCREEN, TOUCH DISPLAY SCREEN AND DISPLAY DEVICE

TECHNICAL FIELD

At least one embodiment of the present disclosure relates to a touch screen, a touch display screen and a display device.

BACKGROUND

With the development of the display technology, the size of the smart terminal device such as the mobile phone, the tablet computer, and the lap top computer is getting larger and larger, which is very convenient to use, but it is very inconvenient to take and carry them due to the large screen. Therefore, the bending device, the folding device, and even the rollable device have become a hot research topic. The folding of the display device includes the folding of the display screen and the folding of the touch screen. Currently, the Organic Light-Emitting Diode (OLED) display screen has been developed rapidly, the folding of the display screen has been achieved in some extent, and corresponding prototypes from some companies are available in the market.

SUMMARY

At least one embodiment of the present disclosure relates to a touch screen, a touch display screen and a display device.

At least one embodiment of the present disclosure provides a touch screen, which includes: a first region and a second region, the first region is bendable and includes a plurality of first touch patterns arranged in an array in a first direction and a second direction, the plurality of first touch patterns are located in a same layer, adjacent first touch patterns are insulated from each other, and the first direction is intersected with the second direction, and the second region is connected with the first region.

In the touch screen provided by one or more embodiments of the present disclosure, the first touch patterns of a same column includes a plurality of first electrodes insulated from each ether, and the first touch patterns of an adjacent column includes a plurality of second electrodes located in odd rows and a plurality of third electrodes located in even rows, the plurality of second electrodes are electrically connected with each other, and the plurality of third electrodes are electrically connected with each other, and the plurality of second electrodes are insulated front the plurality of third electrodes.

In the touch screen provided by one or more embodiments of the present disclosure, the touch screen further includes a plurality of first wires, a plurality of second wires and a plurality of third wires, each of the plurality of first electrodes is connected with one of the plurality of first wires, and adjacent second electrodes of the first touch patterns of the same column are connected with each other by one of the plurality of second wires, and adjacent third electrodes of the first touch patterns of the same column are connected with each other by one of the plurality of third wires, and the second wire and the third wires are arranged at both sides of the first touch patterns of the same column, respectively.

In the touch screen provided by one or more embodiments of the present disclosure, an extending direction of the first wire, an extending direction of the second wire and an extending direction of the third wire are the same as an extending direction of a bending axis of the first region.

In the touch screen provided by one or more embodiments of the present disclosure, the touch screen further includes a plurality of conductive lines, the plurality of first touch patterns are insulated from each other, and each of the plurality of first touch patterns is connected with one of the plurality of conductive lines, and an extending direction of the conductive line is parallel with an extending direction of a bending axis of the first region.

In the touch screen provided by one or more embodiments of the present disclosure, the second region includes at least one sub-region, and the sub-region includes a plurality of first touch groups and a plurality of second touch groups; the plurality of first touch groups are insulated from and are intersected with the plurality of second touch groups; each of the plurality of first touch groups includes a plurality of second touch patterns, and each of the plurality of second touch groups includes a plurality of third touch patterns.

In the touch screen provided by one or more embodiments of the present disclosure, the first touch pattern is a pattern obtained by rotating at least one selected from the group consisting of the second touch pattern and the third touch pattern by a first angle.

In the touch screen provided by one or more embodiments of the present disclosure, the first angle includes 45 degrees.

In the touch screen provided by one or more embodiments of the present disclosure, the plurality of second touch patterns and the plurality of third touch patterns are located in a same layer, and the plurality of second touch patterns are directly connected, and adjacent third touch patterns are connected by a bridge line.

In the touch screen provided by one or more embodiments of the present disclosure, the touch screen further includes a base substrate, the bridge line and the plurality of second touch patterns are located on the base substrate, and an orthographic projection of the bridge line on the base substrate is partially overlapped with an orthographic projection of one of the plurality of second touch patterns on the base substrate.

In the touch screen provided by one or more embodiments of the present disclosure, the bridge line and the plurality of first touch patterns are located in a same layer.

In the touch screen provided by one or more embodiments of the present disclosure, the plurality of first touch patterns are located in the same layer as the plurality of second touch patterns and the plurality of third touch patterns, or the plurality of first touch patterns are located in the same layer as the bridge line.

In the touch screen provided by one or more embodiments of the present disclosure, at least one selected from the group consisting of each of the plurality of first touch patterns, each of the plurality of second touch patterns and each of the third touch patterns has a mesh structure.

In the touch screen provided by one or more embodiments of the present disclosure, the at least one sub-region includes a first sub-region and a second sub-region, and the first region is located between the first sub-region and the second sub-region.

In the touch screen provided by one or more embodiments of the present disclosure, the plurality of first touch groups and the plurality of second touch groups that are located in the first sub-region are insulated from the plurality of first touch groups and the plurality of second touch groups that are located in the second sub-region.

In the touch screen provided by one or more embodiments of the present disclosure, the touch screen further includes a plurality of first signal lines, a plurality of second signal lines, a plurality of third signal lines, a plurality of fourth signal lines, a first touch integrated circuit (IC) and a second touch IC; the plurality of first touch groups located in the first sub-region are connected with the first touch IC by the plurality of first signal lines, respectively; the plurality of second touch groups located in the first sub-region are connected with the first touch IC by the plurality of second signal lines, respectively; the plurality of first touch groups located in the second sub-region are connected with the second touch IC by the plurality of third signal lines, respectively; and the plurality of second touch groups located in the second sub-region are connected with the second touch IC by the plurality of fourth signal lines, respectively.

In the touch screen provided by one or more embodiments of the present disclosure, the touch screen further includes a plurality of fifth signal lines, the plurality of first touch patterns are connected with the second touch IC by the plurality of fifth signal lines, respectively.

At least one embodiment of the present disclosure further provides a touch display screen, which includes any one of the above touch screens; the first region further includes a plurality of first display pixels and a non-display region located between adjacent first display pixels, and each of the plurality of first touch patterns includes a plurality of first conductive lines connected with each other, an orthographic projection of each of the plurality of first conductive lines on a base substrate is located in the non-display region.

At least one embodiment of the present disclosure further provides a display device including any one of the touch screens described above.

At least one embodiment of the present disclosure further provides a display device including any one of the touch display screens described above.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. The terms "on," "under," "right," "left" and the like are only used to indicate relative position relationship, and when the position of the described object is changed, the relative position relationship may be changed accordingly.

The inventor(s) have found that, in a touch display device, a touch layer/touch structure is usually a film layer far from a center of an OLED touch display device. In the case where the touch display device is a foldable device, the touch layer/touch structure has a large bending radius, poor bending endurance, and is prone to generate creases after being bent many times, even cause touch failure, which affects the normal use of the touch display device.

Figure 1:
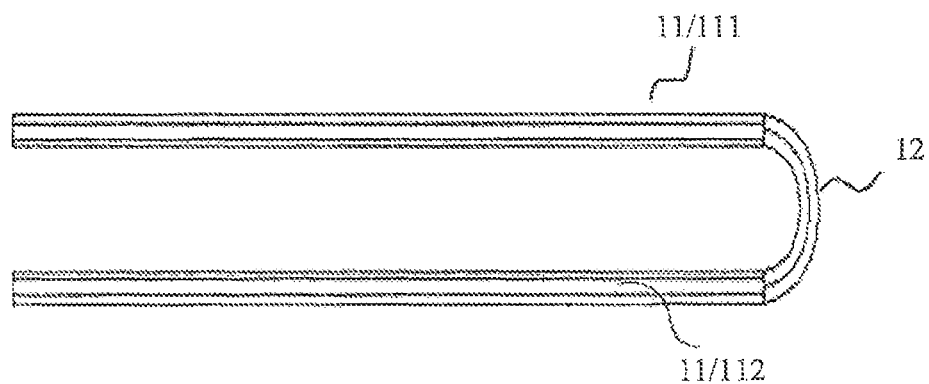
FIG. 1 is a schematic diagram illustrating a foldable touch screen.

FIG. 1 is a schematic diagram illustrating a foldable touch screen. As illustrated in FIG. 1, the touch screen includes a non-bendable region 11 and a bendable region 12. Touch structures are disposed in the non-bendable region 11 and the bendable region 12. The non-bendable region 11 includes a first region 111 and a second region 112. The first region 111 and the second region 112 are both flat regions. The bendable region 12 is located between the first region 111 and the second region 112. The touch screen can be in a flat state and a folded state. The touch screen illustrated in FIG. 1 is in the folded state. When the touch screen is in the folded state, the bendable region 12 is in a curved state and has a curved structure. When the touch screen is in the flat state, the bendable region 12 is in a planar state and has a planar structure. During repeatedly folding or bending the touch screen, the touch structure located in the bendable region 12 is prone to peel or break, thereby causing touch failure.

At least one embodiment of the present disclosure provides a touch screen. The touch structure of the bendable region is not limited by a bending direction, which can improve the bending endurance of the touch screen, increase the touch reliability of the touch screen, and prolong the life-time of the touch screen.

Figure 2A:
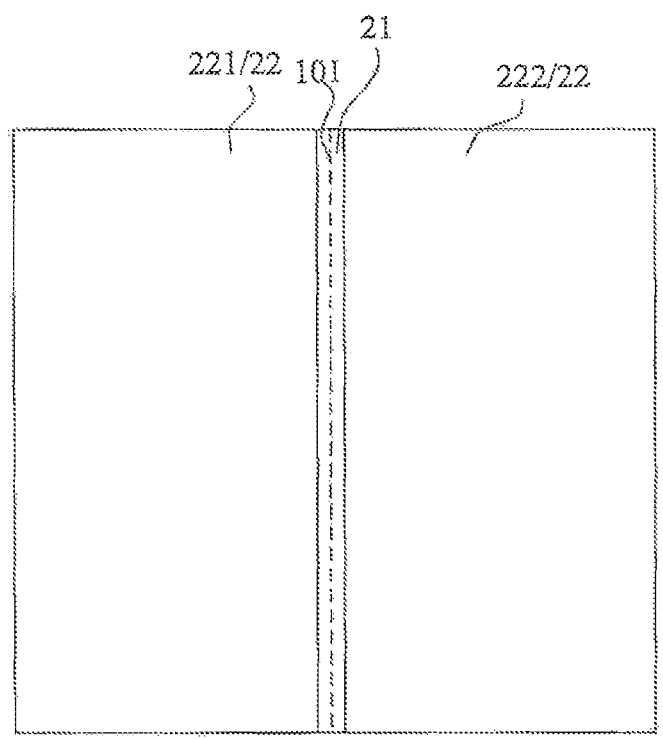
FIG. 2A is a schematic top view illustrating a touch screen provided by an embodiment of the present disclosure.

FIG. 2A is a schematic top view illustrating a touch screen provided by an embodiment of the present disclosure. As illustrated in FIG. 2A, the touch screen includes a first region 21 and a second region 22. The first region 21 can be bent, and the touch screen can be in a flat state or in a folded state.

For example, the first region 21 is in a flat state when the touch screen is in the flat state and is in the curved state when the touch screen is in the folded state. The touch screen includes a touch structure. The touch structure of the touch screen may have a touch structure located in the first region 21 and a touch structure located in the second region 22.

As illustrated in FIG. 2A, the second region 22 includes a first sub-region 221 and a second sub-region 222. Of course, the number of sub-regions included in the second region 22 is not limited to that illustrated in FIG. 2A. In other embodiments of the present disclosure, the second region 22 may include one sub-region or may include three or more sub-regions. That is, the second region 22 includes at least one sub-region in the embodiment of the present disclosure.

As illustrated in FIG. 2A, the second region 22 is connected with the first region 21. For example, the second region 22 is a non-bendable region. In the case where the second region 22 includes a first sub-region 221 and a second sub-region 222, the first sub-region 221 and the second sub-region 222 may be arranged at both sides of the first region 21, respectively. That is, the first region 21 is located between the first sub-region 221 and the second sub-region 222.

FIG. 2A illustrates a schematic top view when the touch screen is in the flat state. When the touch screen is in the flat state, the first region may be of a flat shape. A bending axis 101 of the first region is also illustrated in FIG. 2A. The bending axis 101 is an axis which the touch screen is bent around when bending the touch screen, and whether the touch screen is in the flat state or in the folded state, the axis which the touch screen is bent around can be referred to as the bending axis 101.

Figure 2B:
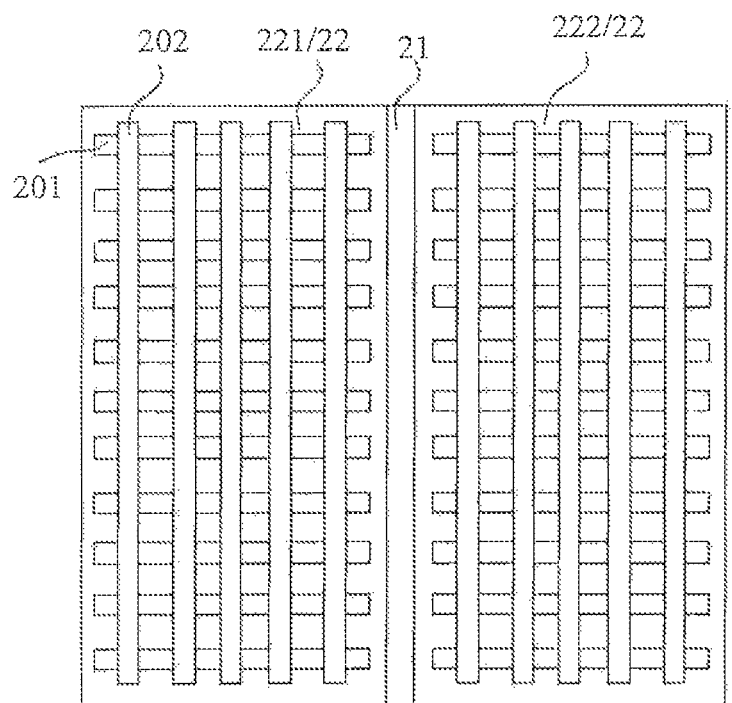
FIG. 2B is a schematic top view illustrating a touch screen provided by an embodiment of the present disclosure.

FIG. 2B is a schematic top view illustrating a touch screen provided by an embodiment of the present disclosure. FIG. 2B illustrates a plurality of first touch electrodes 201 located in the first sub-region 221 and a plurality of second touch electrodes 202 located in the first sub-region 221. The plurality of first touch electrodes 201 are intersected with and insulated from the plurality of second touch electrodes 202. For example, an insulation layer may be provided between the plurality of first touch electrodes 201 and the plurality of second touch electrodes 202. For example, the plurality of first touch electrodes 201 are parallel with each other, and the plurality of second touch electrodes 202 are parallel with each other. The touch structure of the second sub-region 222 may be referred to the touch structure of the first sub-region 221. Of course, this embodiment of the present disclosure is illustrated with reference to the touch structures of the first sub-region 221 and the second sub-region 222 illustrated in FIG. 2B, by way of example, without limited thereto. The touch structure of the second region in the form of the first sub-region 221 and the second sub-region 222 as an example can be designed as required. For example, the first touch electrode 201 may also be referred to as a first touch group, and the second touch electrode 202 may also be referred to as a second touch group.

Figure 3A:
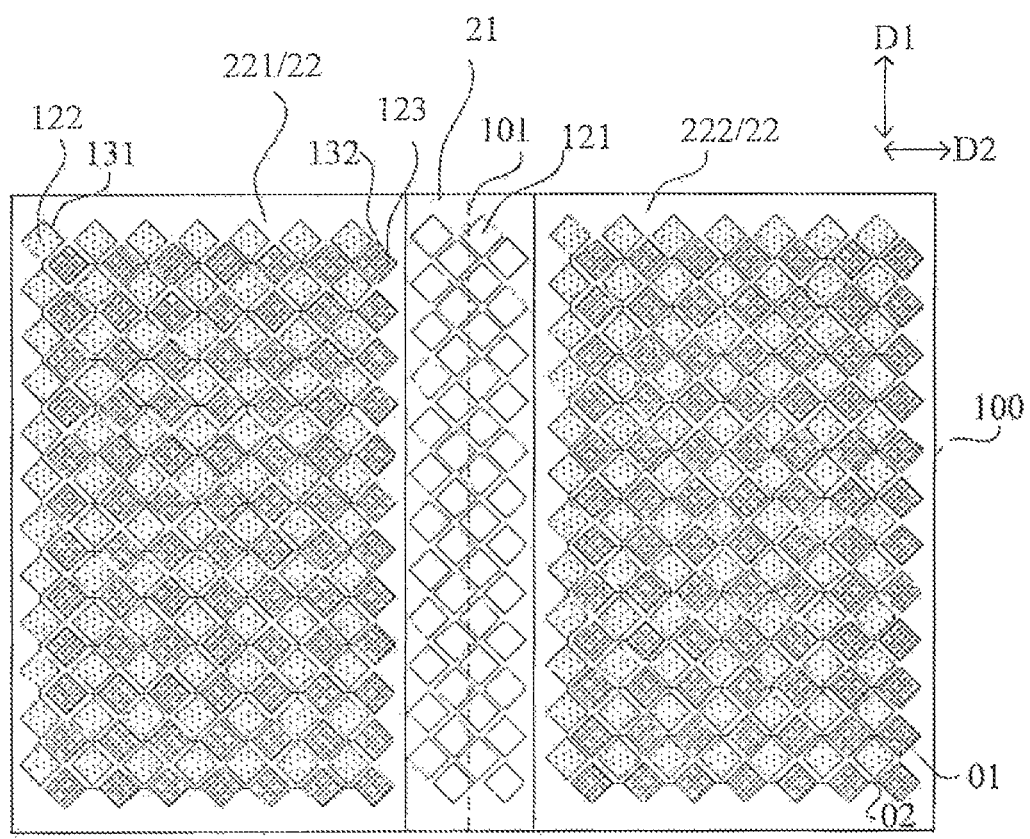
FIG. 3A is a schematic top view illustrating a touch screen provided by an embodiment of the present disclosure.

FIG. 3A is a schematic top view illustrating a touch screen provided by an embodiment of the present disclosure. As illustrated in FIG. 3A, in order to achieve that the first region 21 is not limited by a bending direction, the first region 21 includes a plurality of first touch patterns 121 arranged in an array in a first direction D1 and a second direction D2. The plurality of first touch patterns 121 are in the same layer, and adjacent first touch patterns 121 are insulated from each other. For example, the first region 21 includes a plurality of first touch patterns 121 arranged in an array in the first direction D1 and the second direction D2 when the touch screen is in the flat state. The first direction D1 is intersected with the second direction D2. For example, the first direction D1 is perpendicular to the second direction D2, without limited thereto. For example, the first direction D1 is the direction of the bending axis 101 of the first region 21, and the second direction D2 is a direction that is intersected with the bending axis 101 when the touch screen is in the flat state. For example, the second direction D2 is a direction perpendicular to the bending axis 101 when the touch screen is in the flat state. For example, the first region 21 is flat when the touch screen is in the flat state.

In the touch screen provided by at least one embodiment of the present disclosure, different touch structures are disposed in different regions, by providing a plurality of first touch patterns 121 arranged in an array in the bendable first region, the first region 21 of the touch screen is not limited by the bending direction, and thus it is not necessary to limit an extending direction of the first touch pattern 121. The plurality of first touch patterns 121 can be disposed in the same layer to obtain a single-layer pattern touch in the bendable region, thereby reducing the stress of the film, reducing the peeling or breakage of the touch structure in the bendable region, effectively protecting the touch screen from damage during bending, reducing touch failure and increasing touch reliability.

As illustrated in FIG. 3A, in one or more embodiments of the present disclosure, the first sub-region 221 includes a plurality of first touch groups 131 and a plurality of second touch groups 132. The plurality of first touch groups 131 and the plurality of second touch groups 132 are insulated from each other and are intersected with each other. Each of the plurality of first touch groups 131 includes a plurality of second touch patterns 122, and each of the plurality of second touch groups 132 includes a plurality of third touch patterns 123.

As illustrated in FIG. 3A, in one or more embodiments of the present disclosure, the plurality of second touch patterns 122 and the plurality of third touch patterns 123 are located in the same layer. For example, the plurality of second touch patterns 122 and the plurality of third touch patterns 123 are formed from the same film layer by the same patterning process. Further, for example, the plurality of first touch patterns 121, the plurality of second touch patterns 122 and the plurality of third touch patterns 123 are located in the same layer and are formed from the same film layer by the same patterning process, without limited thereto. For example, as illustrated in FIG. 3A, adjacent second touch patterns 122 are directly connected by a connection line 01, and adjacent third touch patterns 123 are connected by a bridge line 02. In one embodiment, the connection line 01, the plurality of first touch patterns 121, the plurality of second touch patterns 122 and the plurality of third touch patterns 123 are located in the same layer, and are formed from the same film layer by the same patterning process. In another embodiment, the connection line 01, the plurality of second touch patterns 122 and the plurality of third touch patterns 123 are located in the same layer and are formed from the same film layer by the same patterning process; and the plurality of first touch patterns 121 and the bridge line 02 are located in the same layer and are formed from the same film layer by the same patterning process. When a bridge line is used in the touch structure of the second region, the touch structure of the second region is a double-layer structure and is not a single-layer structure.

As illustrated in FIG. 3A, in one or more embodiments of the present disclosure, the touch screen further includes a base substrate 100 which includes a first region 21 and a second region 22. The first region 21 can be bent, and the first region 21 is in a flat state when the touch screen is in a fat state and is in a curved state when the touch screen is in a folded state. The second region 22 includes a first sub-region 221 and a second sub-region 222. The first sub-region 221 includes a plurality of first touch groups 131 and a plurality of second touch groups 132. The plurality of first touch groups 131 and the plurality of second touch groups 132 are located on the base substrate 100. Each of the plurality of first touch groups 131 includes a plurality of second touch patterns 122, and each of the plurality of second touch groups 132 includes a plurality of third touch patterns 123. Adjacent second touch patterns 122 are directly connected by a connection line 01, and adjacent third touch patterns 123 are connected by a bridge line 02. The touch structure of the second sub-region 222 can be referred to the touch structure of the first sub-region 221. As illustrated in FIG. 3A, the bridge line 02 is intersected with the connection line 01. An orthographic projection of the bridge line 02 is not overlapped with an orthographic projection of one of the plurality of second touch patterns 122 on the base substrate 100, without limited thereto. For example, the base substrate 100 includes a flexible substrate. For example, a material of the base substrate 100 includes polyimide (PI).

For example, the first touch pattern 121 illustrated in FIG. 3A may have a mesh structure, so that the line forming the mesh of the first touch pattern 121 can be not arranged in a region where the pixel is located, thereby improving the aperture ratio, and reducing the peeling or breakage of the touch structure of the bendable region, effectively protecting the touch screen from damage during bending, improving the bending endurance of the touch structure in the first region, and increasing the touch reliability. For example, the first touch pattern 121 may have a mesh structure including a plurality of first conductive lines 601 intersected with each other (referring to FIG. 6A). In addition, the first touch pattern 121 has the mesh structure, which is beneficial to the first region of the touch screen not to be limited by the bending direction, reduce the peeling or breakage of the touch structure in the first region, and improve the touch reliability.

As illustrated in FIG. 3A, in one or more embodiments of the present disclosure, the plurality of first touch groups 131 and the plurality of second touch groups 132 that are located in the fast sub-region 221 and the plurality of first touch groups 131 and the plurality of second touch groups 132 that are located in the second sub-region 222 are insulated from each other, to facilitate to be connected with different touch integrated circuits (ICs), respectively.

Figure 3B:
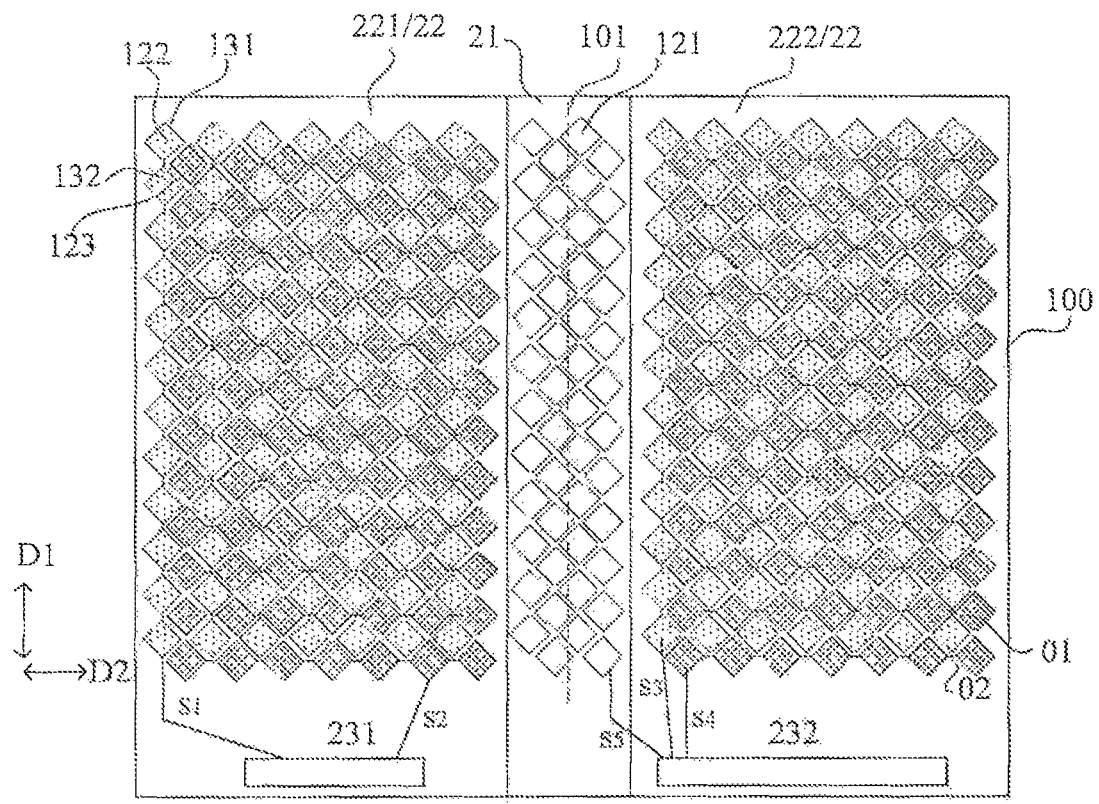
FIG. 3B is a schematic diagram illustrating a touch scree provided by another embodiment of the present disclosure.

FIG. 3B is a schematic diagram illustrating a touch screen provided by another embodiment of the present disclosure. As illustrated in FIG. 3B, the touch screen further includes a plurality of first signal lines S1, a plurality of second signal lines S2, a plurality of third signal lines S3, a plurality of fourth signal lines S4, a first touch IC 231 and a second touch IC 232. The plurality of first touch groups 131 located in the first sub-region 221 are connected with the first touch IC 231 by the plurality of first signal lines S1, respectively; the plurality of second touch groups 132 located in the first sub-region 221 are connected with the touch IC 231 by the plurality of second signal lines S2, respectively; the plurality of first touch groups 131 located in the second sub-region 222 are connected with the second touch IC 232 by the plurality of third signal lines S3, respectively; and the plurality of second touch groups 132 located in the second sub-region 222 are connected with the second touch IC 232 by the plurality of fourth signal lines S4, respectively.

As illustrated in FIG. 3B, in one or more embodiments of the present disclosure, the touch screen further includes a plurality of filth signal lines S5, and the plurality of first touch patterns 121 are connected with the second touch IC 232 by the plurality of fifth signal lines S5, respectively.

For example, when the touch screen is in the folded state, the first sub-region 221 is a normal display region, and the touch is driven by the first touch IC 231. When the touch screen is in the flat state, the full screen is a normal display region, and the full screen touch is driven by the first touch IC 231 and the second touch IC 232 together.

Of course, the arrangement manner of the touch IC is not limited to that illustrated in FIG. 3B, and the touch IC can be arranged as required. For example, the plurality of first touch groups 131 and the plurality of second touch groups 132 that are located in the first sub-region 221 may be connected with one touch IC, the plurality of first touch groups 131 and the plurality of second touch groups 132 that are located in the second sub-region 222 are connected with one touch IC, and the plurality of first touch patterns 121 are connected with one touch IC.

For the sake of clarity the specific manner of all the touch patterns or touch groups connected with the touch IC is not illustrated in FIG. 3B, and can be known by those skilled in the art according to the description of the embodiments of the present disclosure. For example, each touch IC includes a plurality of pins to connect with the touch structures in the first region 21 or the second region 22, respectively. For example, when two elements described as being insulated from each other in the embodiment of the present disclosure are connected with the same touch IC, they are also insulated from each other, and can be applied with signals or can feed back signals, respectively.

Figure 3C:
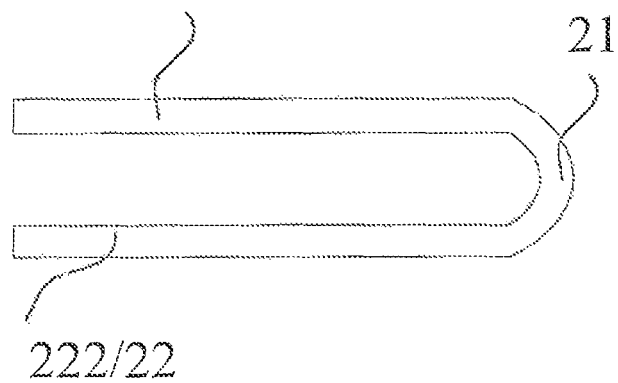
FIG. 3C is a schematic diagram illustrating a touch screen provided by an embodiment of the present disclosure.

FIG. 3C is a schematic diagram illustrating a touch screen provided by an embodiment of the present disclosure. As illustrated in FIG. 3C, the touch screen is in the folded state. As illustrated in FIG. 3C, when the touch screen is in the folded state, the first sub-region 221 and the second sub-region 222 are in the flat state, and the first region 21 is in the curved state. It should be noted that the embodiments of the present disclosure are not limited thereto. For example, when the touch screen is in the folded state, the first sub-region 221 and the second sub-region 222 can also be in a non-flat state.

Figure 4:
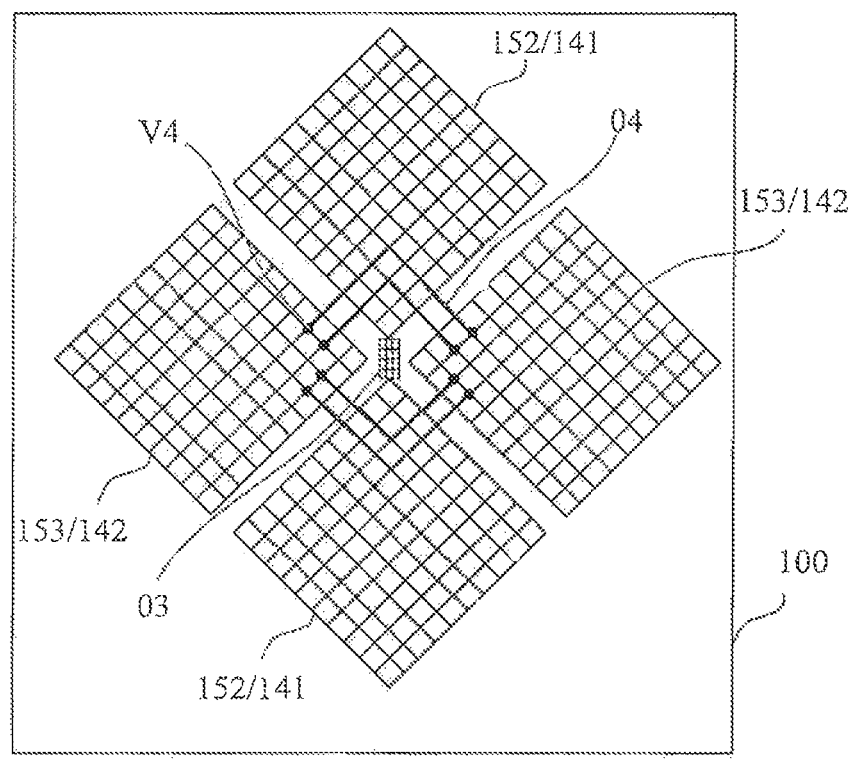
FIG. 4 is a schematic diagram illustrating adjacent second touch patterns, a connection line connecting the adjacent second touch patterns, adjacent third touch patterns, and a bridge line connecting the adjacent third touch patterns of a touch screen provided by an embodiment of the present disclosure.

FIG. 4 is a schematic diagram illustrating adjacent second touch patterns, a connection line connecting the adjacent second touch patterns, adjacent third touch patterns, and a bridge line connecting the adjacent third touch patterns in a touch screen provided by an embodiment of the present disclosure. As illustrated in FIG. 4, each sub-region of the second region of the touch screen includes a plurality of first touch groups 141 and a plurality of second touch groups 142. The plurality of first touch groups 141 and the plurality of second touch croups 142 are located on the base substrate 100. Each of the plurality of first touch groups 141 includes a plurality of second touch patterns 152, and each of the plurality of second touch groups 142 includes a plurality of third touch patterns 153. The adjacent second touch patterns 152 are directly connected by a connection line 03, and the adjacent third touch patterns 153 are connected by a bridge line 04. As illustrated in FIG. 4, the third touch pattern 153 is connected with a corresponding bridge line 04 through a via V4. As illustrated in FIG. 4, in order to reduce a parasitic capacitor and facilitate a detection of a touch position, an orthographic projection of the bridge line 04 on the base substrate 100 is partially overlapped with an orthographic projection of one of the plurality of second touch patterns 152 on the base substrate 100. For example, the orthographic projection of the bridge line 04 on the base substrate 100 is not overlapped with an orthographic, projection of the connection line 03 on the base substrate 100.

As illustrated in FIG. 4, in one or more embodiments of the present disclosure, each of the plurality of second touch patterns 152 and each of the plurality of third touch patterns 153 both have a mesh structure. The second touch pattern 152 and the third touch pattern 153 have the mesh structure, so that the line forming the mesh can be not arranged in the region where the pixel is located, so as to improve the aperture ratio. In the case where the first touch pattern 121, the second touch pattern 152, and the third touch pattern 153 all have the mesh structure, the first touch pattern 121 and the third touch pattern 153 can be formed by using the same mask. In this case, a density of the first touch pattern 121 can be the same as a density of the third touch pattern 153 to form the first touch pattern 121 and the third touch pattern 153 at the same time without changing the mask, without limited thereto. Of course, the density of the first touch pattern 121 can be different from that of the third touch pattern 153. For example, the density of the first touch pattern 121 is greater than that of the third touch pattern 153. For example, the density of the first touch pattern 121 is two times of that of the third touch pattern 153 so as not to reduce the touch accuracy of the first region.

Of course, in other embodiments of the present disclosure, even if the same mask is used, touch patterns with different shapes can be formed, and even if the same mask is used, patterns with different densities can be formed at different positions. The used mask can be made according to the pattern to be formed.

As illustrated in FIG. 4, in one or more embodiments of the present disclosure, the connection line 03 also has a mesh structure. However, in the embodiment of the present disclosure, the connection line 03 may not have a mesh structure. The bridge line 04 in FIG. 4 has a non-mesh structure, but in other embodiments of the present disclosure, the bridge line 04 can also have a mesh structure.

In the touch screen provided by one or more embodiments of the present disclosure, touch patterns having different structures are disposed in different regions, touch control is achieved by arranging a mesh-structure touch pattern of the bridge type in the non-bendable region and arranging a single-layer touch pattern having the mesh structure in the bendable region.

Figure 5A:
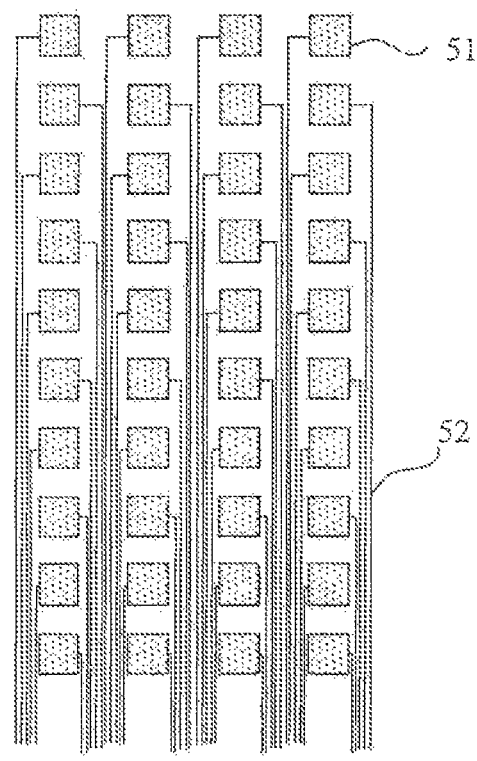
FIG. 5A is a schematic diagram illustrating a plurality of first touch patterns arranged in an array in a first region of a touch screen provided by an embodiment of the present disclosure; FIG.

FIG. 5A is a schematic diagram illustrating a plurality of first touch patterns arranged in an array in a first region of a touch screen provided by an embodiment or the present disclosure. As illustrated in FIG. 5A, the first region (as illustrated in FIG. 2A) of the touch screen includes a plurality of first touch patterns 51 and a plurality of conductive lines 52, the plurality of first touch patterns 51 are insulated from each other, each of the plurality of first touch patterns 51 is connected with one of the plurality of conductive lines 52, and an extending direction of the conductive line 52 is parallel with an extending direction of the bending axis 101 (as illustrated in FIG. 2A) of the first region. In this case, the plurality of first touch patterns 51 can be used as self-capacitance electrodes to achieve detection of a touch position. Of course, in other embodiments of the present disclosure, the extending direction of the conductive line 52 may not be parallel with the extending direction of the bending axis of the first region. For example, the extending direction of the conductive line 52 is perpendicular to the extending direction of the bending axis of the first region.

The touch structure of the first region illustrated in FIG. 5A is a single-layer self-capacitive structure. For example, each of the first touch patterns 51 can be applied with a driving signal and can feed back a signal to achieve a detection of a touch position.

Figure 5B:
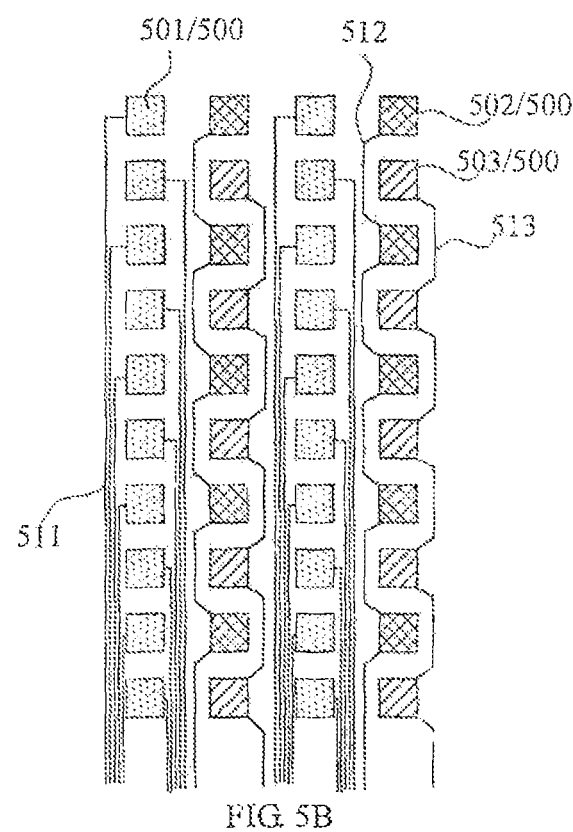
FIG. 5B is a schematic diagram illustrating a plurality of first touch patterns arranged in an array in a first region of a touch screen provided by another embodiment of the present disclosure.

FIG. 5B is a schematic diagram illustrating a plurality of first touch patterns arranged in an array in a first region of a touch screen provided by another embodiment of the present disclosure. As illustrated in FIG. 5B, the first region 21 (as illustrated in FIG. 2A) of the touch screen includes a plurality of first touch patterns 500, and the plurality of first touch patterns 500 form a plurality of rows and a plurality of columns. The first touch patterns 500 of the same column (for example, the first touch patterns of the first column illustrated in FIG. 5B) include a plurality of first electrodes 501 insulated from each other, and the first touch patterns 500 of a column adjacent thereto (for example, the first touch pattern of the second column illustrated in FIG. 5B) include a plurality of second electrodes 502 in odd rows and a plurality of third electrodes 503 in even rows. The plurality of second electrodes 502 are electrically connected with each other and the plurality of third electrodes 503 are electrically connected with each other, and the plurality of second electrodes 502 and the plurality of third electrodes 503 are insulated from each other.

The touch structure of the first region illustrated in FIG. 5B is a single-layer mutual capacitance structure. For example, the first touch patterns in the odd columns can be applied with driving signals and the first touch patterns in the even columns can feedback signals to detect the touch position, without limited thereto.

In one or more embodiments of the present disclosure, as illustrated in FIG. 5B, the touch screen includes a plurality of first wires 511, a plurality of second wires 512 and a plurality of third wires 513. Each Of the plurality of first electrodes 502 is connected with one of the plurality of first wires 511, and adjacent second electrodes 502 of the same column of the first touch patterns 500 are connected by one of the plurality of second wires 512, adjacent third electrodes 503 of the same column of the first touch patterns 500 are connected by one of the plurality of third wires 513; the second wire 512 and the third wire 513 are arranged at both sides of the first touch patterns 500 of the same column, respectively.

In one or more embodiments of the present disclosure, as illustrated in FIG. 5B, extending directions of the first wire 511, the second wire 512 and the third wire 513 are parallel with an extending direction of the bending axis 101 (as illustrated in FIG. 2A) of the first region 21 (as illustrated in FIG. 2A), without limited thereto. That is, the extending directions of the first wire 511, the second wire 512 and the third wire 513 are the same as the direction of the bending axis of the first region. In other embodiments, the extending directions of the first wire 511, the second wire 512 and the third wire 513 are not parallel with the extending direction of the bending axis 101 (as illustrated in FIG. 2A) of the first region 21 (as illustrated in FIG. 2A). For example, the extending directions of the first wire 511, the second wire 512, and the third wire 513 are perpendicular to the extending direction of the bending axis 101 (illustrated in FIG. 2A) of the first region 21 (illustrated in FIG. 2A).

Figure 6A:
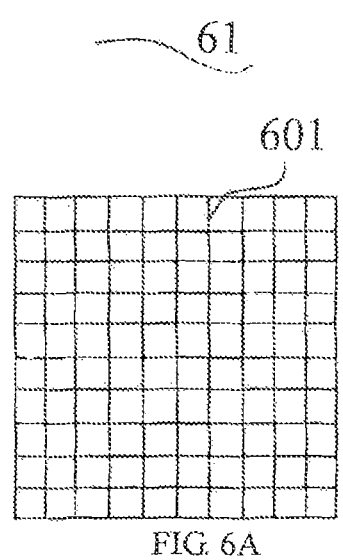
FIG. 6A is a schematic diagram illustrating a single first touch pattern in a first region of a touch screen provided by an embodiment of the present disclosure.

FIG. 6A is a schematic diagram illustrating a single first touch pattern in a first region of a touch screen provided by an embodiment of the present disclosure. As illustrated in FIG. 6A, the single first touch pattern 61 has a mesh structure. The first touch pattern 61 includes a plurality of first conductive lines 601 connected with each other. The structure of the first touch pattern 121 in the embodiment of the present disclosure can be referred to the structure of the first touch pattern 61.

As illustrated in FIG. 6A, in one or more embodiments of the present disclosure, a shape of the first touch pattern 61 is the same as a shape of at least one selected from the group consisting of the second touch pattern 122 and the third touch pattern 123 located in the second region, without limited thereto. Every two of the shapes of the first touch pattern 61, the second touch pattern 122 and the third touch pattern 123 can be different from each other. For example, the shapes of the first touch patterns 61 located in the first region can be different, the shapes of the second touch patterns 122 located in the second region can be different, and the shapes of the third touch patterns 123 located in the second region can also be different. For example, the shape of at least one selected from the group consisting of the second touch pattern 122 and the third touch pattern 123 includes a rectangle, without limited thereto. In the embodiment of the present disclosure, the shapes of the first touch pattern 61, the second touch pattern 122 and the third touch pattern 123 are determined as required. The touch patterns with different shapes can be formed even if the same mask is used.

As illustrated in FIG. 6A, in combination with FIG. 3A, in one or more embodiments of the present disclosure, the first touch pattern 61 is a pattern obtained by rotating at least one selected from the group consisting of the second touch pattern 122 and the third touch pattern 123 by a first angle. For example, the first angle includes 45 degrees, without limited thereto. For example, the first touch pattern 61 is a pattern obtained by rotating the second touch pattern 122 or the third touch pattern 123 by 45 degrees, without limited thereto.

Figure 6B:
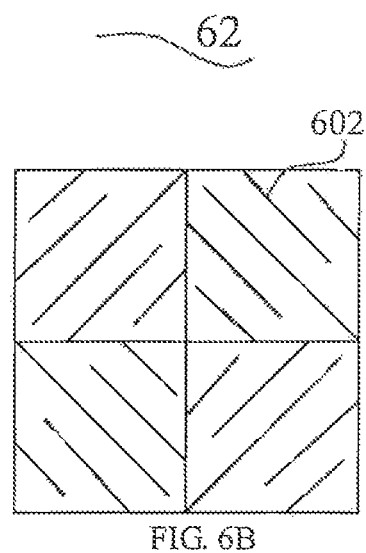
FIG. 6B is a schematic diagram illustrating a single first touch pattern of a first region of a touch screen provided by another embodiment of the present disclosure.

FIG. 6B is a schematic diagram illustrating a single first touch pattern of a first region in a touch screen provided by another embodiment of the present disclosure. As illustrated in FIG. 6B, the single first touch pattern 62 has a mesh structure. The first touch pattern 62 includes a plurality of first conductive lines 602 connected with each other. The structure of the first touch pattern 121 in the embodiment of the present disclosure can also be referred to the structure of the first touch pattern 62.

At least one embodiment of the present disclosure further provides a touch display screen, which includes any one of the touch screens described above.

Figure 7A:
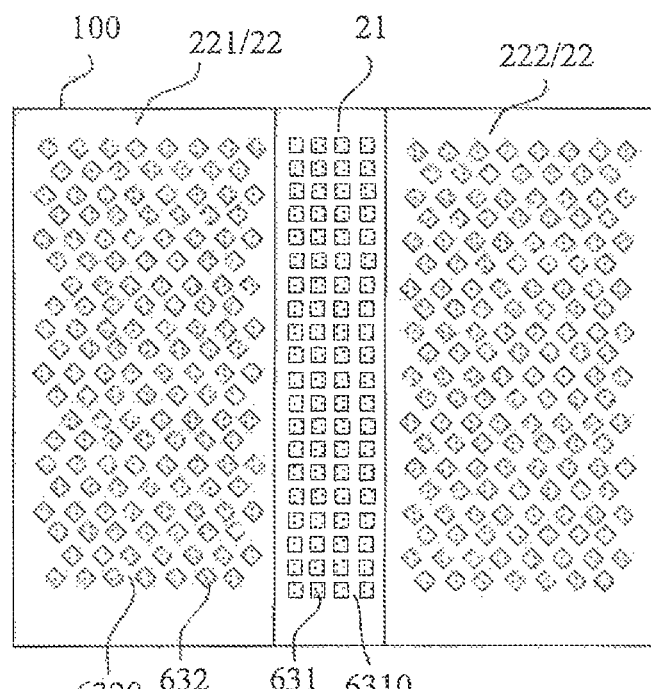
FIG. 7A is a schematic diagram illustrating a touch display screen provided by an embodiment of the present disclosure.

FIG. 7A is a schematic diagram illustrating a touch display screen provided by an embodiment of the present disclosure. As illustrated in FIG. 7A, the first region 21 of the touch display screen further includes a plurality of first display pixels 631 and a non-display region (non-pixel region) 6310 located between adjacent first display pixels 631. As illustrated in FIG. 7A, the second region 22 of the touch display screen further includes a plurality of second display pixels 632 and a non-display region 6320 located between adjacent second display pixels 632.

Figure 7B:
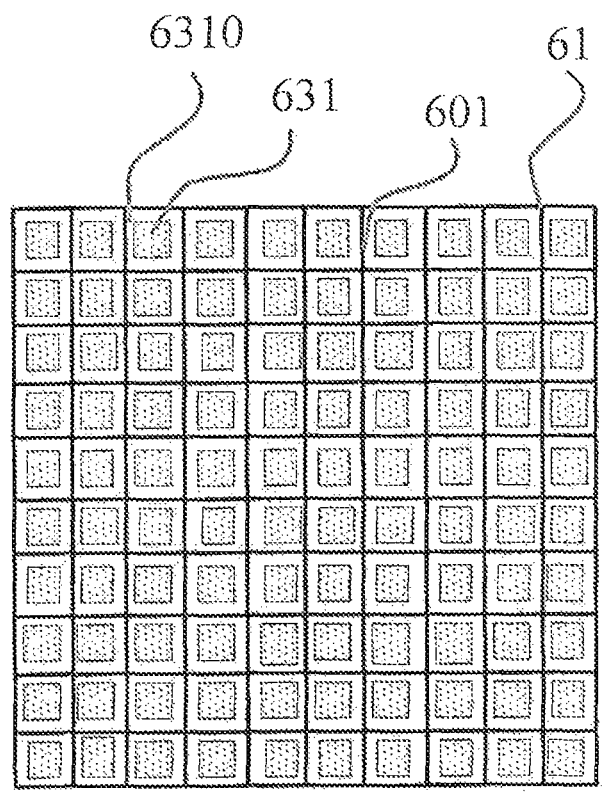
FIG. 7B is a schematic diagram illustrating positions where a plurality of first conductive lines of a first touch pattern and a first display pixel are disposed in a touch display screen provided by an embodiment of the present disclosure.

FIG. 7B is a schematic diagram illustrating positions where a plurality of first conductive lines of a first touch pattern and a first display pixel are located in a touch display screen provided by an embodiment of the present disclosure. As illustrated in FIG. 7A and FIG. 7B, the first touch pattern 61 includes a plurality of first conductive lines 601 connected with each other, and orthographic projections of the plurality of first conductive lines 601 on the base substrate 100 (as illustrated in FIG. 7A) are located within the non-display regions 6310, to avoid the first touch pattern from affecting the tight output effect of the touch display screen, so that the aperture ratio of the touch display screen is not affected. That is, the orthographic projections of the plurality of first conductive lines 601 on the base substrate 100 are not overlapped with the orthographic projections of the plurality of first display pixels 631 on the base substrate 100 (as illustrated in FIG. 7).

Figure 7C:
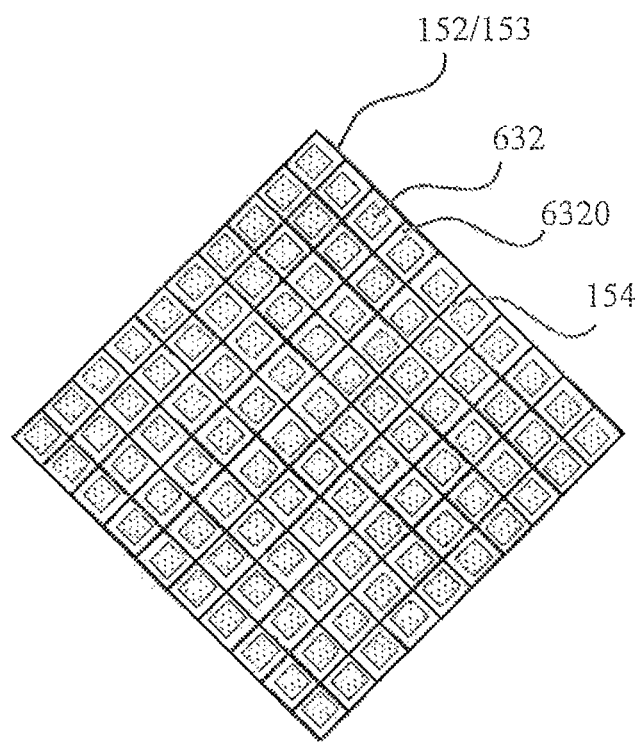
FIG. 7C is a schematic diagram illustrating positions where a plurality of second conductive lines of a second touch pattern/third touch pattern and a second display pixel are disposed in a touch display screen provided by an embodiment of the present disclosure.

FIG. 7C is a schematic diagram illustrating positions where a plurality of second wires of a second touch pattern/third touch pattern and a second display pixel are disposed in a touch display screen provided by an embodiment of the present disclosure. As illustrated in FIG. 7C, the second touch pattern 152 or the third touch pattern 153 includes a plurality of second conductive lines 154 connected with each other. Orthographic projections of the plurality of second conductive lines 154 on the base substrate are located within the non-display regions 6320, to avoid effecting the light output effect. That is, orthographic projections of the plurality of second conductive lines 154 on the base substrate are not overlapped with orthographic projections of the plurality of second display pixels 632 on the base substrate. Therefore, the arrangement of the touch structure does not affect the aperture ratio of the touch display screen by arranging the touch patterns having the mesh structure in positions not overlapped with the display pixels.

In order to improve the aperture ratio of display, the signal lines of the touch structure can also be arranged in a similar manner. For example, in order to achieve a high aperture ratio, the conductive line 52 illustrated in FIG. 5A can also be located in the non-display region 6310. For example, in order to achieve a high aperture ratio, at least one selected from the group consisting of the first wire, the second wire and the third wire in FIG. 5B is also located in the non-display region 6310.

For example, adjacent first conductive lines 601 are connected end to end to from an enclosed region, and one of the plurality of first display pixels 631 is located in the enclosed region. For example, each of the plurality of first touch patterns includes a plurality of the enclosed regions, and the plurality of enclosed regions includes enclosed regions having different areas. For example, the plurality of first conductive lines include adjacent first conductive lines with different spaces, without limited thereto. For example, the plurality of first conductive lines include adjacent first conductive lines with the same space. The size of the enclosed region and the space between adjacent first conductive lines can be determined according to the size of the pixel.

It should be explained that, in the embodiments of the present disclosure, a region formed by adjacent conductive lines is not limited to an enclosed region. For example, in other embodiments, the region formed by adjacent wires is not an enclosed region, that is, the region formed by the adjacent wires has an opening, as illustrated in FIG. 6B.

For example, the orthographic projections of the second conductive lines 154 on the base substrate 100 are not overlapped with the orthographic projections of the second display pixels 632 on the base substrate 100.

For example, the first touch pattern 121, the second touch pattern 122 and the third touch pattern 123 can be formed of a metal material, without limited thereto. For example, at least one selected from the group consisting of the first wire, the second wire and the third wire can be formed of a metal material, without limited thereto.

Figure 8:
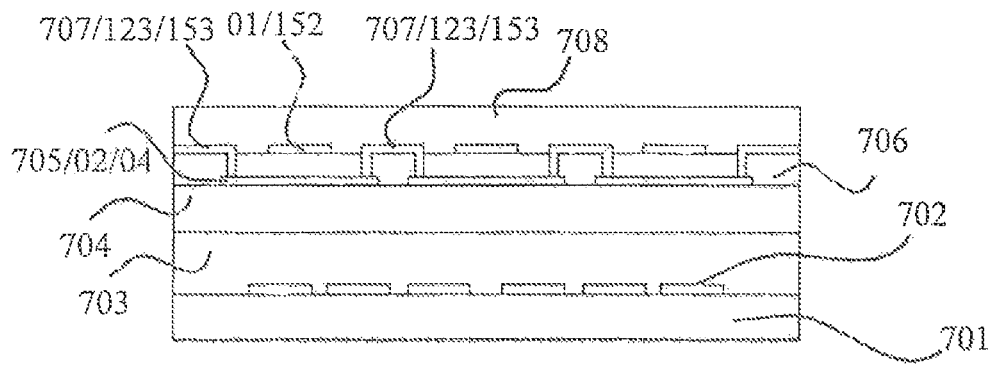
FIG. 8 is a schematic diagram illustrating a stacked layer structure of a non-bendable region of a touch display panel provided by an embodiment of the present disclosure.

FIG. 8 is a schematic diagram illustrating a stacked layer structure of a non-bendable region of a touch display panel provided by an embodiment of the present disclosure. The non-bendable region can be the second region 22 illustrated in FIG. 3A or 3B. As illustrated in FIG. 8, an OLED unit 702 and an encapsulation layer 703 are disposed on a base substrate 701. A barrier layer 704 is disposed on the encapsulation layer 703. A bridge layer 705 is disposed on the harrier layer 704. An insulation layer 706 is disposed on the bridge layer 705. A touch layer 707 that is a touch-sensitive functional layer is disposed on the insulation layer 706. A protection layer 708 is disposed on the touch layer 707. For example, the base substrate 701 is a flexible substrate, and a material of the base substrate 701 includes PI. For example, the bridge layer 705 includes a plurality of bridge lines, and the touch layer 707 may include the second touch pattern, the third touch pattern and the connection line 03, without limited thereto. For example, the bridge layer 705 includes the plurality of bridge lines 02, the touch layer 707 includes the third touch pattern 123 and the connection line 01, and the touch layer 707 further includes the second touch pattern 122, which is not illustrated in FIG. 8 and can be referred to FIG. 3A. For another example, the bridge layer 705 includes the plurality of bridge lines 04, the touch layer 707 includes the third touch pattern 153 and the second touch pattern 152, and the touch layer 707 further includes the connection line 03, which is not illustrated in FIG. 8 and can be referred to FIG. 4.

Figure 9:
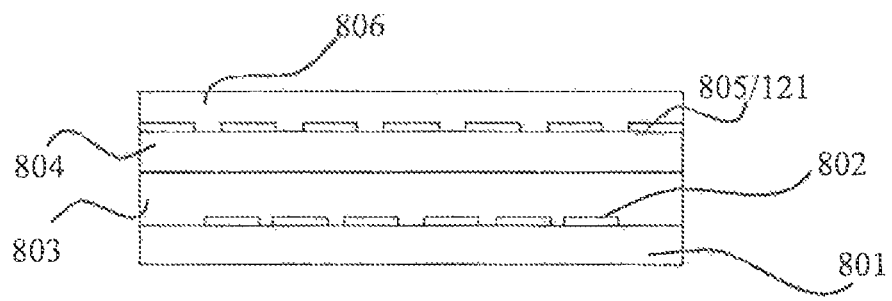
FIG. 9 is a schematic diagram illustrating a stacked layer structure of a bendable region of a touch display panel provided by an embodiment of the present disclosure.

FIG. 9 is a schematic diagram illustrating a stacked layer structure of a bendable region of a touch display panel provided by an embodiment of the present disclosure. The bendable region can be the first region 21 illustrated in FIG. 3A or FIG. 3B. As illustrated in FIG. 9, an organic light-emitting diode (OLED) unit 802 is disposed on the base substrate 801, a thin film encapsulation (TFE) layer 803 is disposed on the OLED unit 802, a barrier layer 804 is disposed on the TFE layer 803, a touch layer 805 is disposed on the barrier layer 804, and a protection layer 806 is disposed on the touch layer 805. For example, the touch layer 805 includes the plurality of first touch patterns 121. For example, the base substrate 801 is a flexible substrate, and a material of the base substrate 801 includes PI. For example, the touch layer 805 is a metal mesh touch functional layer.

Figure 10:
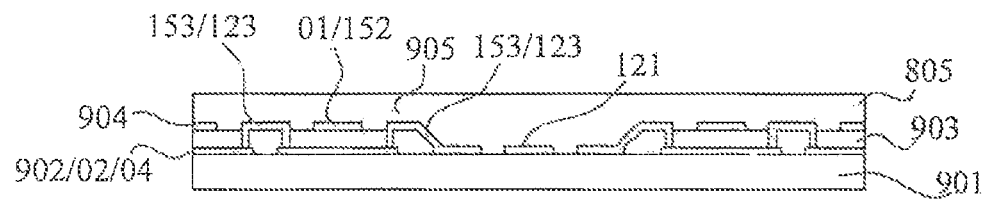
FIG. 10 is a schematic diagram illustrating a continuous stacked layer structure of a bendable region and a non-bendable region of a touch display panel provided by an embodiment of the present disclosure.

FIG. 10 is a schematic diagram illustrating a stacked layer structure of a bendable region and a non-bendable region of a touch display panel provided by an embodiment of the present disclosure. The non-bendable region can be the second region 22 illustrated in FIG. 3A or FIG. 3B. The bendable region can be the first region 21 illustrated in FIG. 3A or FIG. 3B. As illustrated in FIG. 10, a bridge layer 902 is disposed on a barrier layer 901, an insulation layer 903 is disposed on the bridge layer 902, a touch layer 904 is disposed on the insulation layer 903, and a protection layer 905 is disposed on the touch layer 904. For example, the bridge layer 902 includes a plurality of bridge lines. For example, the first touch pattern 121 of the first region 21 (the bendable region) can be formed in the same layer as the bridge layer 902 or in the same layer as the touch layer 904. For example, the bridge layer 902 includes a plurality of bridge lines 02, the touch layer 904 includes the third touch pattern 123 and the connection line 01 and the touch layer 904 further includes the second touch pattern 122, which is not illustrated in FIG. 10 and can be referred to FIG. 3A. For another example, the bridge layer 902 includes the plurality of bridge lines 04, the touch layer 904 includes the third touch pattern 153 and the second touch pattern 152, and the touch layer 904 further includes the connection line 03, which is not illustrated in FIG. 10 and can be referred to FIG. 4.

At least one embodiment of the present disclosure further provides a display device including any one of the above touch screens or any of the above touch display screens.

For example, the display device includes an OLED display device, without limited thereto.

For example, in an embodiment of the present disclosure, the touch structure can be disposed above an encapsulation layer to form an on-cell touch screen. The encapsulation layer includes a Thin Film Encapsulation (TFE) layer. Of course, when the display device is a liquid crystal display device, an on-cell touch screen can also be formed.

It should be explained that, for the purpose of clarity only, in accompanying drawings for illustrating the embodiment(s) of the present disclosure, the thickness and size of a layer or a structure may be enlarged. However, it should be understood that, in the case in which a component or element such as a layer, film, area, substrate or the like is referred to be "on" or "under" another component or element, it may be directly on or under the another component or element or a component or element is interposed therebetween.

In the embodiments of the present disclosure, the patterning or patterning process may include only a photolithography process, or include a photolithography process and an etching process, or may include printing, inkjet, and other processes for forming a predetermined pattern. The photolithography process refers to processes including film formation, exposure, and development, for using photoresist, mask, and exposure machine to form a pattern. A corresponding patterning process may be selected according to a structure formed in an embodiment of the present disclosure.

Furthermore, the embodiments of the present disclosure and the features therein can be combined with each other in the absence of conflict.

The above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A touch scream comprising:
a first region, being bendable and comprising a plurality of first touch patterns arranged in an array in a first direction and a second direction, wherein the plurality of first touch patterns are located in a same layer, adjacent first touch patterns are insulated from each other, and the first direction is intersected with the second direction; and
a second region, connected with the first region,
wherein the first touch patterns of a first column comprises a plurality of first electrodes insulated from each other, and
the first touch patterns of a second column comprise a plurality of second electrodes located in odd rows and a plurality of third electrodes located in even rows, the second column is adjacent to the first column, the plurality of second electrodes are electrically connected with each other, and the plurality of third electrodes are electrically connected with each other, and the plurality of second electrodes are insulated from the plurality of third electrodes.

2. The touch screen according to claim 1, further comprising a plurality of first wires, a plurality of second wires and a plurality of third wires, wherein each of the plurality of first electrodes is connected with one of the plurality of first wires, and adjacent second electrodes of the first touch patterns of the second column are connected with each other by one of the plurality of second wires, and adjacent third electrodes of the first touch patterns of the second column are connected with each other by one of the plurality of third wires, and the second wire and the third wires are arranged at both sides of the first touch patterns of the second column, respectively.

3. The touch screen according to claim 2, wherein an extending direction of the first wire, an extending direction of the second wire and an extending direction of the third wire are the same as an extending direction of a bending axis of the first region.

4. The touch screen according to claim 1, further comprising a plurality of conductive lines, wherein the plurality of first touch patterns are insulated from each other, and each of the plurality of first touch patterns is connected with one of the plurality of conductive lines, and an extending direction of the conductive line is parallel with an extending direction of a bending axis of the first region.

5. The touch screen according to claim 1, wherein the second region comprises at least one sub-region, and the sub-region comprises a plurality of first touch groups and a plurality of second touch groups;
the plurality of first touch groups are insulated from and are intersected with the plurality of second touch groups;
each of the plurality of first touch groups comprises a plurality of second touch patterns, and each of the plurality of second touch groups comprises a plurality of third touch patterns.

6. The touch screen according to claim 5, wherein the first touch pattern is a pattern obtained by rotating at least one selected from the group consisting of the second touch pattern and the third touch pattern by a first angle.

7. The touch screen according to claim 6, wherein the first angle comprises 45 degrees.

8. The touch screen according to claim 7, wherein the at least one sub-region comprises a first sub-region and a second sub-region, and the first region is located between the first sub-region and the second sub-region.

9. The touch screen according to claim 8, wherein the plurality of first touch groups and the plurality of second touch groups that are located in the first sub-region are insulated from the plurality of first touch groups and the plurality of second touch groups that are located in the second sub-region.

10. The touch screen according to claim 8, further comprising a plurality of first signal lines, a plurality of second signal lines, a plurality of third signal lines, a plurality of fourth signal lines, a first touch integrated circuit (IC) and a second touch IC, wherein the plurality of first touch groups located in the first sub-region are connected with the first touch IC by the plurality of first signal lines, respectively; the plurality of second touch groups located in the first sub-region are connected with the first touch IC by the plurality of second signal lines, respectively; the plurality of first touch groups located in the second sub-region are connected with the second touch IC by the plurality of third signal lines, respectively; and the plurality of second touch groups located in the second sub-region are connected with the second touch IC by the plurality of fourth signal lines, respectively.

11. The touch screen according to claim 10, further comprising a plurality of fifth signal lines, wherein the plurality of first touch patterns are connected with the second touch IC by the plurality of fifth signal lines, respectively.

12. The touch screen according to claim 5, wherein the plurality of second touch patterns and the plurality of third touch patterns are located in a same layer, and the plurality of second touch patterns are directly connected, and adjacent third touch patterns are connected by a bridge line.

13. The touch screen according to claim 12, wherein the plurality of first touch patterns are located in the same layer as the plurality of second touch patterns and the plurality of third touch patterns, or the plurality of first touch patterns are located in the same layer as the bridge line.

14. The touch screen according to claim 7, wherein at least one selected from the group consisting of each of the plurality of first touch patterns, each of the plurality of second touch patterns and each of the third touch patterns has a mesh structure.

15. The touch screen according to claim 1, wherein the first direction is an extending direction of a bending axis of a first region, and the second direction is a direction perpendicular to the bending axis in a case where the touch screen is in a flat state.

16. A display device comprising the touch screen according to claim 1.

17. A touch screen, comprising:
a first region, being bendable and comprising a plurality of first touch patterns arranged in an array in a first direction and a second direction, wherein the plurality of first touch patterns are located in a same layer, adjacent first touch patterns are insulated from each other, and the first direction is intersected with the second direction; and
a second region, connected with the first region,
wherein the second region comprises at least one sub-regions, and the sub-region comprises a plurality of first touch groups and a plurality of second touch groups;
the plurality of first touch groups are insulated from and are intersected with the plurality of second touch groups;
each of the plurality of first touch groups comprises a plurality of second touch patterns, and each of the plurality of second touch groups comprises a plurality of third touch patterns,
wherein the plurality of second touch patterns and the plurality of third touch patterns are located in a same layer, and the plurality of second touch patterns are directly connected, and adjacent third touch patterns are connected by a bridge line,
further comprising a base substrate, wherein the bridge line and the plurality of second touch patterns are located on the base substrate, and an orthographic projection of the bridge line on the base substrate is partially overlapped with an orthographic projection of one of the plurality of second touch patterns on the base substrate.

18. The touch screen according to claim 17, wherein the bridge line and the plurality of first touch patterns are located in a same layer.

19. A touch screen, comprising:
a first region, being bendable and comprising a plurality of first touch patterns arranged in an array in a first direction and a second direction, wherein the plurality of first touch patterns are located in a same layer, adjacent first touch patterns are insulated from each other, and the first direction is intersected with the second direction; and
a second region,, connected with the first region,
wherein the first region further comprises a plurality of first display pixels and a non-display region located between adjacent first display pixels, and each of the plurality of first touch patterns comprises a plurality of first conductive lines connected with each other, an orthographic projection of each of the plurality of first conductive lines on a base substrate is located in the non-display region.

* * * * *

UNITED STATES PATENT AND TRADEMARK OFFICE
CERTIFICATE OF CORRECTION

| | |
|---|---|
| PATENT NO. | : 11,256,359 B2 |
| APPLICATION NO. | : 16/650530 |
| DATED | : February 22, 2022 |
| INVENTOR(S) | : Shihpo Chou and Jing Zhang |

It is certified that error appears in the above-identified patent and that said Letters Patent is hereby corrected as shown below:

In the Claims

Claim 14, Line 1, the dependency is changed to replace "claim 7" with --claim 5--.

Signed and Sealed this
Eighth Day of August, 2023

Katherine Kelly Vidal
*Director of the United States Patent and Trademark Office*